Oct. 25, 1949.   G. H. NORQUIST   2,485,648
METHOD OF MAKING METAL CLAD PANELS
Original Filed Oct. 3, 1944   3 Sheets—Sheet 1
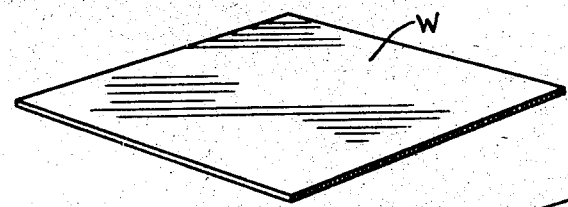
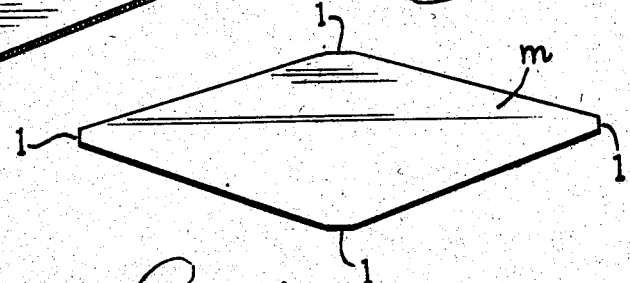
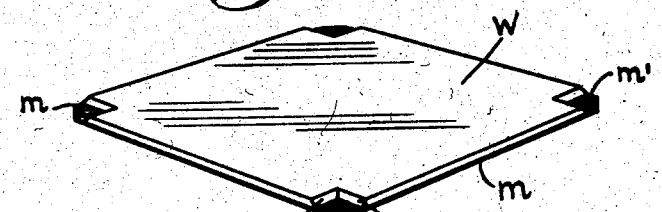
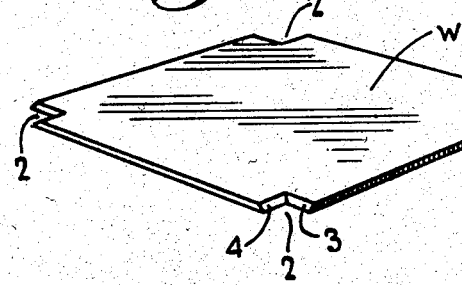
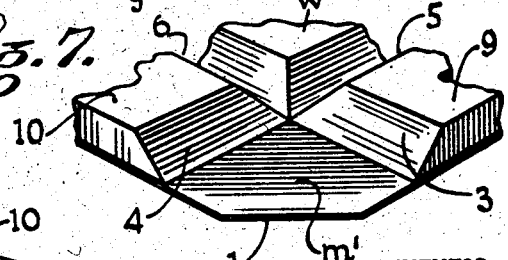
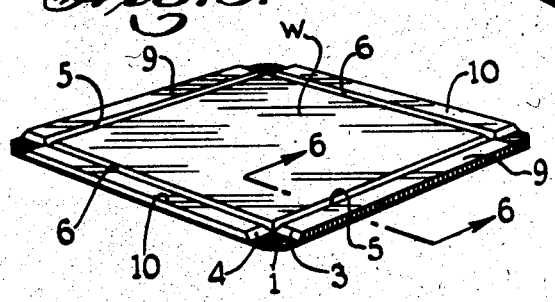
INVENTOR.
GLENN H. NORQUIST
BY
ATTORNEY Oct. 25, 1949.    G. H. NORQUIST    2,485,648
METHOD OF MAKING METAL CLAD PANELS
Original Filed Oct. 3, 1944    3 Sheets-Sheet 2
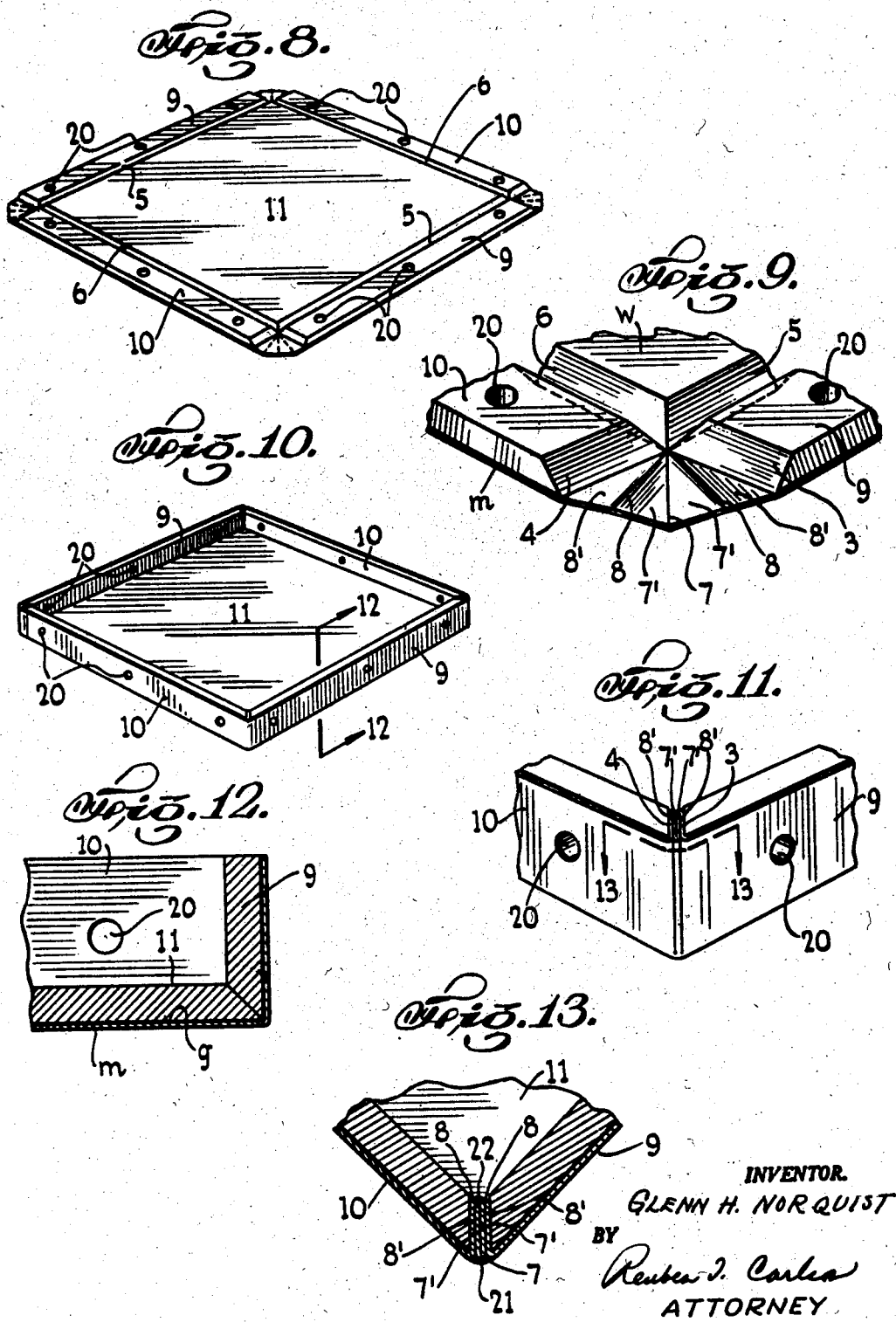
INVENTOR.
GLENN H. NORQUIST
BY
Reuben J. Carlson
ATTORNEY

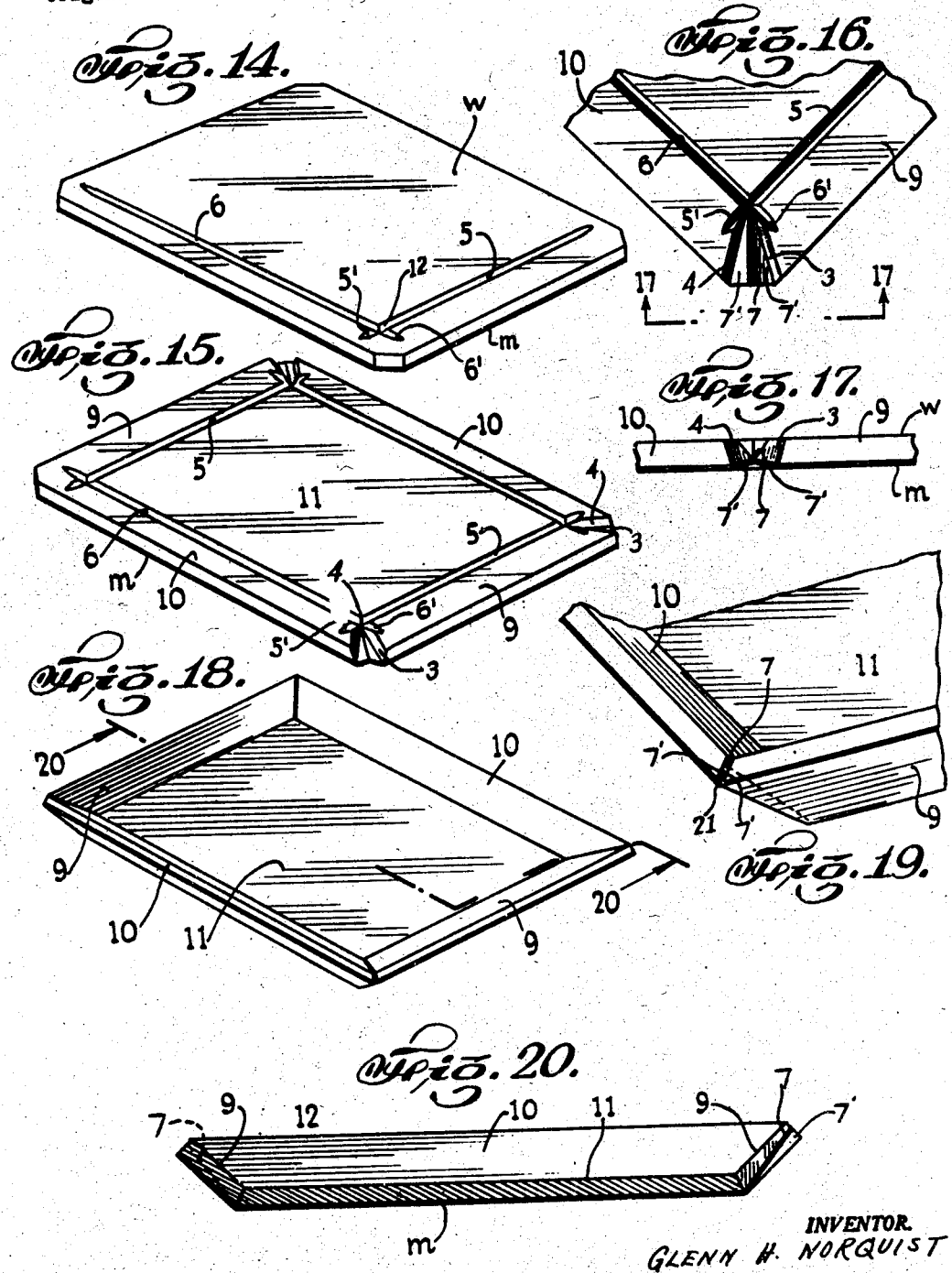

Patented Oct. 25, 1949

2,485,648

UNITED STATES PATENT OFFICE 2,485,648

METHOD OF MAKING METAL-CLAD PANELS

Glenn H. Norquist, Jamestown, N. Y.

Original application October 3, 1944, Serial No. 557,022. Divided and this application August 23, 1946, Serial No. 692,528

5 Claims. (Cl. 29—148)

This invention relates to a method for making metal clad panels, and more particularly to an improved method for flanging and corner reinforcing metal clad panels. This application is a division of my copending application Serial No. 557,022, filed October 3, 1944.

Metal clad panels, comprising a metal sheet bonded to a base sheet, may be advantageously employed in the manufacture of packing cases, shelving, table tops, counters, cabinets and numerous other finished products where strength, durability, lightness in weight and attractive appearance are important requisites. The base sheet customarily used comprises a layer, sheet or panel of wood, plywood, fiberboard, paperboard, wallboard or other composition material and the surfacing metal customarily used comprises a sheet or layer of stainless or galvanized steel, copper, brass, aluminum, magnesium or other suitable metal. Where the base sheet is relied upon to give substantial added strength to the construction, a plywood base sheet, comprising a plurality of thin layers of wood cemented together by a resinous cement, can be advantageously employed.

As a step in manufacture of a finished product from such metal clad panels, it is often necessary to form flanges or side sections which extend at a predetermined angle to the main or body section of the panel, and to join the adjacent ends of such flanges to provide a smooth and finished corner. It has heretofore been customary to cut out or remove a V-section from the corner of both the base sheet and metal facing sheet prior to forming of the flanges and the shaping thereof at the proper angle to the main section of the panel. Attempts to later solder together the adjacent severed ends of the metal which form the corner ends of the flanges, has produced corners lacking rigidity and strength and unsightly in appearance. This weakness and lack of strength is in part due to blow-holes in the solder caused by gases generated when the hot solder flowing between the corner ends of the metal flanges contacts the base sheet and the adhesive which secures the base sheet to the metal sheet.

It is an object of this invention is to provide an improved method for forming flanges and corners on metal clad panels which possess great strength and rigidity.

Other objects and advantages of this invention will become apparent as the disclosure proceeds.

Although the characteristic features of this invention will be particularly pointed out in the claims appended hereto, the invention itself, and the manner in which it may be carried out, may be better understood by referring to the following description taken in connection with the accompanying drawings forming a part hereof, in which Fig. 1 is a perspective view of the base sheet used in forming the metal clad panel and which may comprise plywood, fiberboard, or other composition material;

Fig. 2 is a perspective view of the metal sheet to be applied to the base sheet;

Fig. 3 is a perspective view of the base sheet after the corners thereof have been notched;

Fig. 4 is a perspective view of the corner notched base sheet adhesively secured to the metal sheet, leaving the corners of the metal sheet exposed;

Fig. 5 is a perspective view of the metal clad panel showing flange defining grooves cut in the base sheet;

Fig. 6 is an enlarged fragmentary cross-sectional view taken through the metal clad panel along line 6—6 of Fig. 5, showing particularly the flange defining groove cut in the base sheet;

Fig. 7 is an enlarged fragmentary perspective view of a corner portion of the metal clad panel shown in Fig. 5, this view particularly illustrating details of the corner formation prior to crimping the corner section of the metal sheet;

Fig. 8 is a perspective view of the panel as shown in Fig. 5 after the corner sections of the metal sheet have been crimped;

Fig. 9 is an enlarged fragmentary perspective view of a corner portion of the panel shown in Fig. 8;

Fig. 10 is a perspective view of the metal clad panel after the flanges thereof have been shaped to the desired contour;

Fig. 11 is an enlarged fragmentary perspective view illustrating the corner formation of the flanged panel in greater detail;

Fig. 12 is an enlarged fragmentary cross-sectional view taken through one of the flange sections and the base section of the flanged panel shown in Fig. 10, as the same appears when viewed along line 12—12 of Fig. 10;

Fig. 13 is an enlarged fragmentary cross-sectional view through the corner portion of the flanged panel as the same appears when viewed along the line 13—13 of Fig. 11, this view particularly showing the corner section of the metal sheet folded to provide a quadruple ply corner reinforcing rib;

Fig. 14 is a perspective view of a metal clad panel comprising a base sheet and attached metal sheet in which the base sheet is provided with flange defining grooves prior to notching out the corners of the base sheet;

Fig. 15 shows the panel illustrated in Fig. 14 at a further stage of manufacture and in which the base sheet has four flange defining grooves cut therein and the wedge shaped corner sections removed therefrom, the facing metal remaining uncut and not weakened;

Fig. 16 is an enlarged fragmentary top plan view of the notched panel illustrated in Fig. 15, this view showing the corner formation of the panel in greater detail prior to shaping the flanges thereof;

Fig. 17 is an enlarged edge view of the corner of the panel as it appears when viewed along line 17—17 of Fig. 16;

Fig. 18 is a perspective view of the panel having the flanges shaped to extend at an angle of about 45° to the facing section;

Fig. 19 is an enlarged fragmentary perspective view particularly illustrating the corner formation of the flanged panel shown in Fig. 18; and Fig. 20 is a cross sectional view of the flanged panel as it appears when viewed along line 20—20 of Fig. 18.

Similiar reference characters refer to similar parts throughout the several views of the drawings and specification.

In accordance with this invention, the metal clad panel is formed from a base sheet $w$ having a metal sheet $m$ firmly and permanently cemented to one side thereof. The base sheet $w$ as shown in Fig. 1 may be advantageously formed from a plurality of superimposed thin layers of wood or veneer, which are firmly bonded by a suitable cement. A base sheet $w$ formed of plywood can be made so as to possess great strength when the wood or veneer layers are cemented together by phenolic and urea compounds and then subjected to heavy pressure and substantial heat. Such plywood sheets and their method of manufacture are well-known in the art. It is understood, however, that the metal surfacing sheet $m$ as shown in Fig. 2 may be applied to a base sheet formed from other fibrous sheet materials, it being appreciated that a base sheet is selected which would best serve the purpose for which the final product is to be used. For example, where a panel is to be formed which possesses high heat or high sound dampening or insulating qualities, a suitable fiber board or fiber base sheet may be used, but where great strength and rigidity is required, a plywood base sheet is preferably used. Therefore, it is understood that the words base sheet as used herein is intended to broadly refer to laminated plywood, fiberboard, paperboard, wood, or any other relatively firm sheeting material adapted for the purpose for which the final product is to be used.

This invention more particularly relates to the construction and formation of flanges and corners on metal clad blanks providing a panel having flanges or side wall sections extending at an angle to the main section of the panel, and to the construction and formation of the corners of the panel.

There is shown in Fig. 10 of the drawings a metal clad panel wherein the flanges thereof extend at an angle of approximately 90° to the facing section thereof, and Fig. 18 illustrates another type of metal clad panel in which the flange sections extend at an angle of approximately 45° to the facing section thereof.

In one method of assembly the corners of the base sheet $w$ are notched or cut out as at 2, shown in Fig. 3, before the base sheet is cemented or secured to the metal sheet $m$. The V-shaped corner notch is so formed and shaped so that when the flanges of the metal clad panel are formed a smooth and finished corner construction is produced. For example, when the finished flanges are to extend at an angle of substantially 90° to the facing section of the panel, the apex of the corner notch, as shown in Fig. 3, has approximately a 90° angle, and the corner ends 3 and 4 of the base sheet are cut on a bevel of approximately 45° as shown more particularly in Fig. 7. When the metal sheet $m$ has been secured to the corner notched base sheet $w$ as by suitable adhesive $g$, the corner section $m'$ of the metal sheet $m$ is exposed, as shown in Figs. 5 and 7. Grooves 5 and grooves 6 generally V-shaped in cross-section are cut in the base sheet, as shown in Fig. 5, the adjacent ends of the grooves 5 and 6 intersecting or meeting at the apex of the corner notch 2 cut in the base sheet. The panel thus formed is defined by a facing section 11 and flange or side wall sections 9 and 10, the ends 3 of the flange section 9 and the ends 4 of the flange section 10 being beveled so that these adjacent ends are substantially parallel when the flanges have been fully formed.

Where the flanges of the panel to be formed are to extend at an angle of approximately 90° to the facing section 11, the corners of the metal sheet $m$ may be beveled off, as at 1, prior to attachment of the metal sheet $m$ to the base sheet $w$, so that when the flanged panel has been completed as shown in Fig. 11, no sharp corners of metal project beyond the adjacent flanged edges of the base sheet.

In the next operation, as shown in Figs. 8 and 9, the corners of the metal sheet are crimped on a metal die so that the desired rib forming folds will be formed in the corner metal. As shown more particularly in Fig. 9, the medial crimp line 7 is formed in the corner metal, and a pair of intermediate crimp lines 8 are also formed in the corner metal, dividing the corner metal into a pair of intermediate triangular segments 7' and a pair of spaced triangular segments 8', which are later to be folded together in overlap or accordion relationship to provide the quadruple-ply corner-reinforcing rib shown in Fig. 11. Such a quadruple-ply corner reinforcing rib can advantageously be formed where the flange sections of the finished panel are to extend at right angles to the facing section thereof. It will be appreciated, however, that where the flanges are to extend at an angle of approximately 45° to the facing section, the corner rib may be formed as a double ply construction requiring only the formation of a medial fold line 7 in the corner metal as shown in Fig. 16. It will be further appreciated that the corner metal may be folded to provide a six ply reinforcing rib by the provision of the necessary number of fold lines in the corner metal. It is generally desirable to provide a sufficient number of folds in the corner metal so that the reinforcing rib as formed will not extend inwardly beyond the plane of the inside face of the base sheet of the finished flanges.

Suitable holes or apertures 20 may be punched in the flanged sections 9 and 10 of the panel shown in Fig. 8 at the same time that the corner metal crimping operation is performed. The holes 20 may be punched any convenient desired distance apart to provide means for securing adjacent panels together, or for such other purposes as fabrication of the flanged panel into the final product may require.

In a subsequent operation, the flat panel as shown in Fig. 8 is placed in a forming press and the flanged sections are bent to the desired angle with respect to the facing section 11, as shown in Fig. 10. The press used for this purpose is equipped with a shaping mandrel or die, which bends and shapes the metal parts of the flanges. Due to the line folds 7 and 8 in the corner metal, the corner metal will normally fold into the form of a rib, as illustrated in Figs. 11 and 13, and so that the intermediate triangular segments 7' will tightly overlap one another and the spaced triangular segment 8' will tightly overlap the adjacent faces of the intermediate triangular segments 7'. The spaced triangular segments 8' will also snugly overlap the adjacent beveled ends 3 and 4 of the flange sections 9 and 10 of the base sheet, thus forming a quadruple ply metal reinforcing rib snugly wedged between the beveled ends 3 and 4 of the flanged sections 9 and 10 of the base sheet. The accordion folding of the triangular segments 7' and 8' may be positively assured by the provision of knives at the corners of the mandrel to facilitate the folding operation. Such means are usually not needed in the formation of a double ply rib, but may be used conveniently in cases where a 4-ply or 6-ply corner reinforcing rib is to be formed. The plies of the reinforcing rib may, if desired, be further strengthened by the application of welding or soldering metal to the outer corner as at 21, or to the inner corner as at 22 as illustrated more particularly in Fig. 13. The outer corner may then be burnished or ground to give the corner a smooth and finished appearance.

There is shown in Figs. 14 to 17 inclusive, a somewhat modified series of steps which may be used in the formation of a flanged metal clad panel. In the construction here shown the metal clad sheet m is first attached to the base sheet w. The grooves 5 and 6 are then cut in the base sheet, as shown in Fig. 14, so that the flange forming sections 9 and 10 of the base sheet w are substantially severed from the main section 11 of the base sheet by the grooves 5 and 6. The grooves 5 and 6 may be cut by a grooving wheel, and extend to meet at a corner intersection point 12. If a grooving wheel is used, the ends 5' and 6' of the grooves 5 and 6 may extend slightly beyond the intersection point 12 to make sure that the fibrous sheet w is fully cut through at the intersection point 12, thus avoiding the necessity of chiseling out any remaining fibrous material at the intersection point 12.

In the next operation, V-shaped segments, as shown in Fig. 15, are cut out from the base sheet w at the corners thereof, the apex of the triangular cut out being positioned adjacent at the intersection point 12. The triangular shaped segments may be cut from the corners of the base sheet by an automatic machine of improved design. The shape of the triangular cut-out should be such that the adjacent flanged ends 3 and 4 of the fibrous sheet w, will meet to form a mitered joint when the flanges of the panel are bent to the desired shape. It will be noted by referring more particularly to Figs. 3, 4, 15 and 17 that the flange ends 3 and 4 are cut on a bias to insure a finished mitered joint when the flanges are formed.

The corners m' of the metal sheet may be crimped on a suitable die at the same time and on the same machine which cuts the notches 2 in the corners of base sheet w. In cases where the flange sections 9 and 10 are to extend at an angle of approximately 45°, more or less, with respect to main or face section 11, only a single medial fold line 7 need be formed in the corner metal. The medial fold line 7 divides the exposed corner metal into two similar triangular shaped segments 7'.

When the corner-notched metal clad panel as illustrated in Fig. 15 is placed in a forming press, the forming die shapes the flange sections 9 and 10 into the desired flanged position and the paired triangular segments 7' of the corner metal will naturally fold together into parallel relationship and become tightly wedged between the adjacent ends 3 and 4 of the flange sections 9 and 10 of the base sheet. Thus it will be noted that the reinforcing rib is formed from the excess corner metal when the flange sections are bent into position. The metal rib formations greatly strengthens and reinforces the corners of the finished panel. The corners of the flanged panel may be further strengthened by seam welding or soldering the exposed outer corner 21 of the metal or the inner edge 22 of the rib, and when the metal corner is then burnished or ground it presents a smooth and finished appearance with no corner seam visible.

Improved metal clad flanged panels formed as above described may be manufactured at relatively low cost and at a high production rate. Base sheets and metal sheets composed of selected materials may be assembled and cut to provide a metal clad panel of any desired size and form. The corners of the base sheet may be miter cut so that the corner ends 3 and 4 correspond to the angularity at which the finished flanges of the panel are to extend. The V-shaped grooves 5 and 6 are cut so as to substantially sever the fibrous base sheet w and are located so as to form flanges 9 and 10 of the desired width. The V-shaped grooves 5 and 6 should have a base width sufficient to permit formation of flanges of the desired angularity when the finished flanged panel is formed. A slow drying bonding cement may be forced into the grooves 5 and 6, and also deposited between the adjacent free ends 3 and 4 of the flange sections 9 and 10 of the base sheet, thereby firmly bonding together the flange sections 9 and 10 to the main section of the base sheet, and the adjacent flange ends 3 and 4 to the intertwined metal rib.

It will be noted that the metal sheet presents unbroken corner sections tightly wedged between the flange ends 3 and 4. The double ply metal ribs formed by the accordion folded triangular segments may be soldered or seam welded together at 21 or 22 to provide a corner construction of great strength and rigidity. After welding or soldering, the exterior metal surface of the corner may be burnished or ground to give the corner a finished appearance. The panel as thus constructed possesses great strength, and the corners possess special strength and resistance to strains and blows.

It will be appreciated that the flanges of the panel may be made of any desired width, and may be formed to extend at any desired angle with respect to the main section 11 of the panel. It is therefore understood that this invention is not limited to panels having flanges of any particular width, or flanges extending at any particular angle to the main section of the panel.

Flanged metal clad panels may be used in the manufacture of finished products where extra strong corners of neat and finished appearance are required. By constructing the flanged metal clad panels in accordance with the teachings of this invention, a flanged panel is provided of unusual strength and rigidity, adapted to meet all requirements, and which can be manufactured at relatively low cost.

It is understood that the improved metal clad panel above described finds use and application in the manufacture of numerous useful products, such as advertising signs, packing cases and boxes, table tops, restaurant counters, wall panels, cupboards, desks, cabinets, and generally in the field of furniture, fixtures, building interiors, and transportation conveyances. It is, therefore, understood that various modes and methods of applying the principles of this invention may be employed, change being made in regard to details required by the particular application, and that changes and modifications in the form, construction and arrangement and combination of the several parts may be made and substituted for those herein shown and described without departing from the broad principles of this invention.

What is claimed is:

1. The method of making a flanged metal clad panel formed from a base sheet and a flexible metal sheet which comprises, removing triangular shaped segments from the corners of the base sheet to define the adjacent ends of the flange sections thereof, adhesively securing the base sheet to the metal sheet so as to leave the corner portions of the metal sheet uncovered and exposed, cutting grooves in the base sheet to further define the main section and flange sections, forming a crimp in the corners of said metal sheet, bending the metal sheet along said grooves to form corresponding metal flanges and folding the metal corners to provide rib formations extending between the adjacent ends of the flange sections of the base sheet.

2. The method of making a flanged metal clad panel formed from a base sheet cemented to a flexible metal sheet which comprises, cutting grooves in the base sheet to define a main section and a plurality of flange sections, removing triangular shaped segments from the corners of said base sheet to define the adjacent ends of the flange sections and substantially simultaneously forming a crimp in each corner of the metal sheet, bending the metal sheet along said grooves to form corresponding metal flanges and substantially simultaneously folding the crimped corner metal to provide rib formations extending between the adjacent ends of the flange sections of the base sheet.

3. The method of making a flanged metal clad panel formed from a base sheet and a flexible metal facing sheet which comprises, removing triangular shaped segments from the corners of the base sheet to define the adjacent ends of the flange sections thereof, adhesively securing the base sheet to the metal sheet so as to leave the corner portions of the metal sheet uncovered and exposed, cutting grooves in the base sheet to further define the main section and flange sections, forming a crimp in the corners of said metal sheet, bending the metal sheet along said grooves to form corresponding metal flanges, and folding the metal corners to provide inturned rib formations extending inwardly between the adjacent ends of the flange sections of the base sheet.

4. The method of making a flanged metal clad panel formed from a base sheet cemented to a flexible metal facing sheet which comprises, cutting grooves in the base sheet to define a main section and a plurality of flange sections, removing triangular shaped segments from the corners of said base sheet to define the adjacent ends of the flange sections and substantially simultaneously forming a crimp in each corner of the metal sheet, bending the metal sheet along said grooves to form corresponding metal flanges and substantially simultaneously folding the crimped corner metal inwardly to provide inturned rib formations extending between the adjacent ends of the flange sections of the base sheet.

5. The method of making a flanged metal clad panel formed from a fibrous base sheet bonded to a flexible metal facing sheet which includes, cutting a V-shaped notch in a corner of the base sheet, cutting V-shaped grooves in the base sheet extending from the vortex of the corner notch and thence generally parallel to the adjacent side edges of the base sheet to define a main section and a pair of flange sections, the adjacent ends of the fibrous flange sections being cut on a bevel whereby said V-shaped corner notch presents bevel faces with the corner section of the metal facing sheet exposed, bending the metal sheet along said grooves to form corresponding metal flanges facing the exterior of the flange sections of the base sheet, and substantially simultaneously folding the metal corner section inwardly to provide a plural-ply inturned rib formation extending between the adjacent beveled ends of the flange sections of the base sheet, the plies of said rib formation being compacted together in substantially face to face contact by pressure exerted against the outer faces of the outer plies by the adjacent beveled ends of the flange sections of the base sheet as said flange sections are bent into final position.

GLENN H. NORQUIST.

REFERENCES CITED

The following references are of record in the file of this patent:

UNITED STATES PATENTS

| Number | Name | Date |
|---|---|---|
| 9,949 | Tewksbury | Aug. 10, 1853 |
| 163,088 | Martyn | May 11, 1875 |
| 325,374 | Wright | Sept. 1, 1885 |
| 972,113 | Katzinger | Oct. 4, 1910 |
| 1,165,860 | Fairchild | Dec. 28, 1915 |
| 1,711,471 | Curran | Apr. 30, 1929 |
| 2,034,489 | Scherer | Mar. 17, 1936 |
| 2,134,051 | Kirby | Oct. 25, 1938 |
| 2,149,882 | Clements | Mar. 7, 1939 |